Patented Oct. 6, 1953

2,654,679

UNITED STATES PATENT OFFICE 2,654,679

STABILIZED REACTION PRODUCTS OF RUBBERY POLYMERS WITH INORGANIC ACIDIFYING COMPOUNDS

Johan Michael Goppel, Gottfried Ernst Rumscheidt, and Johannes Thomas Hackmann, Amsterdam, Netherlands, assignors to Shell Development Company, San Francisco, Calif., a corporation of Delaware No Drawing. Application April 26, 1949, Serial No. 89,801. In The Netherlands May 18, 1948

19 Claims. (Cl. 117—138.8)

This invention is directed to a process for the stabilization of products formed on reacting inorganic acidifying compounds with rubbery polymers comprising high molecular weight, polyunsaturated compounds. The invention also relates to the resulting stabilized reaction products.

The term "high molecular weight, polyunsaturated compound," as employed herein, embraces those compounds having a molecular weight of at least 5,000 and which contain a plurality of unsaturated linkages in the molecule. These compounds are either polymers of organic compounds containing a plurality of unsaturated linkages in the molecule, or are copolymers of such multiple-unsaturated compounds with other unsaturated organic compounds of one type or another. The term includes the various natural rubbers such as latex, crepe, sheet, caoutchouc, gutta percha, balata, and cyclo rubbers, as well as unsaturated synthetic rubbers. Representative synthetic polymers of high molecular weight are the polymerization products of butadiene and those of its homologues and derivatives, as, for example, methyl butadiene polymers, dimethyl butadiene polymers, pentadiene polymers, and chloroprene polymers (neoprene synthetic rubber). Representative copolymers of high molecular weight which come within the term are those formed from butadiene, its homologues and derivatives, with other unsaturated organic compounds. Among the latter are the acetylenes, as vinyl acetylene, the olefins, as isobutylene which copolymerizes with butadiene to form butyl synthetic rubber; the vinyls, as vinyl chloride, acrylic acid, acrylonitrile (which polymerizes with butadiene to form the synthetic rubber Buna-N), methacrylic acid, and styrene, the latter compound polymerizing with butadiene to form the synthetic rubber Buna S; as well as the vinyl esters and various unsaturated aldehydes, ketones and ethers, e. g., acrolein, methyl isopropenyl ketone, and vinyl ethyl ether. The above-defined, polyunsaturated, high molecular weight compounds, including both natural and synthetic rubbers, may properly be termed "high molecular weight polymers of diene-hydrocarbons," or preferably, "rubbery polymers of at least one compound selected from the group consisting of the conjugated diolefines and chloroprene."

As employed herein, the term "inorganic acidifying compound" embraces the various inorganic acids and acid anhydrides wherein the acid-forming element (as sulfur, nitrogen or phosphorus, for example), if possessing several valencies, is present, in a valency other than the highest thereof. Preferred acidifying compounds are the acid anhydrides, sulfur dioxide, phosphorus trioxide and nitrous trioxide, as well as the acids formed from these anhydrides. Other useful acidifying compounds are hydrogen sulfide, hydrochloric acid, hydrobromic acid, hydroiodic acid, and hydrofluoric acid. The term does not include such compounds as sulfur trioxide, phosphorus pentoxide, nitrogen pentoxide, or their corresponding acids, for in all these compounds the acid-forming element, which is here either sulfur, phosphorus or nitrogen, is present in the highest of several possible valencies. Of the various acidifying compounds set forth herein, the most preferred compound for employment in the present invention is sulfur dioxide.

It is known that the high molecular weight polyunsaturated compounds lend themselves well to the production of various shapes, including those of a continuous, non-supported nature, as filaments, rods, strips, sheets, and the like. Furthermore, it is known that the properties of such shapes may be improved by reacting the unsaturated, high molecular weight compound with one or more of the inorganic acidifying compounds mentioned above, particularly sulfur dioxide. The exact nature of this reaction is not clearly understood, though it is evident that a quantity of the acidifying ingredient is taken up in one form or another by the high molecular weight reactant. The extent of this reaction is normally measured by, and expressed in terms of, the amount of acid-forming element (sulfur, phosphorus or nitrogen, for example) present in the resulting reaction product.

It has also been possible to improve the nature of the foregoing reaction products by incorporating therein, normally prior to the reaction with sulfur dioxide or other acidifying ingredient, a quantity of a low molecular weight, unsaturated compound. The resulting reaction product has a number of advantages, chief among which is a greatly improved acceptance for all the commonly employed dyestuffs. Representative unsaturated compounds which may be employed in this manner, all of which have a molecular weight of below 5,000 are alkadienes such as butadiene and 1,5-hexadiene, and alkenyl compounds such as allyl alcohol, allyl chloride, allyl acetate, allyl capronate, allyl isothiocyanate, allyl oleate, and more especially, diallyl compounds such as diallyl phthalate and diallyl adipate. The method by which unsaturated reactants of both high and low molecular weight are utilized in forming reaction products with acidifying compounds forms the subject of copending application, Serial No. 15,048, filed March 15, 1948, and reference is hereby made to said application for a more complete description of the invention there disclosed.

It should be noted that while the high molecular weight, polyunsaturated compounds, or mixtures of both high as well as low molecular weight unsaturated compounds, may be reacted with the acidifying compound without prior modification of either reactant, improved results are obtained when the unsaturated compounds are first activated by treatment with a hydroperoxide such as decalin hydroperoxide, or tetralin hydroperoxide. Activation methods of this nature are disclosed in copending applications, Serial Nos. 760,924, filed July 14, 1947, and 788,312, filed November 26, 1947, to which applications reference is here made. The peroxide treatment is also disclosed in copending application Serial No. 15,048, referred to above, as said activation treatment relates to mixtures of high and low molecular weight unsaturated reactants.

While the reaction products discussed above have proven well adapted for many uses, they have proven particularly useful when formed into filaments of the type which can be woven into textiles, either alone or in conjunction with fibers of other materials. Thus, filaments produced by spinning a peroxide-activated rubber solution into a sulfur dioxide-containing coagulating bath have a high elementary denier, with good tensile strength, a relatively high degree of elongation prior to rupture, and good flexibility and other characteristics making for ease of working and handling. In view of these many favorable qualities, it has been highly disappointing to realize that even in the case of the best reaction products hitherto obtainable, deterioration of the filament or other shape with age, heating and/or exposure to ultra-violet light is unduly rapid. This deterioration is manifested in a variety of ways, but chiefly in a sharp falling off in tensile strength and in the degree of permissible stretch prior to rupture. In many instances undesirable color changes also ensue. These various changes are greatly speeded up as the objects under consideration are heated, particularly above 100° C., or are exposed to ultra-violet light. It has been observed that the deterioration in physical properties is attended by a loss of sulfur dioxide or equivalent acid constituent from the reaction product, a loss which is generally proportional to the aforementioned deterioration. Accordingly, the rapidity with which a given product loses its acid constituent may also be taken as a measure of its stability, i. e., its resistance to deterioration with age, heating, and/or exposure to ultra-violet or other light rays.

It is an object of the present invention to provide a method for obtaining stable products of the type formed on the reaction of high molecular weight, polyunsaturated compounds with inorganic acidifying compounds, or of both such compounds with low molecular weight, unsaturated compounds.

A more particular object is to provide filaments and like continuous, non-supported shapes composed of the reaction products discussed above, yet which are highly stable and are characterized by a continued high tensile strength and degree of stretch prior to rupture, as well as by a relatively small loss of acidifying compound, when said filaments or shapes are aged, heated and/or exposed to light rays.

The nature of still other objects will become apparent from the following description of the invention.

It has been discovered that excellent resistance to deterioration with age, heat and/or exposure to ultra-violet light may be imparted to objects composed of the product formed on reacting high molecular weight, polyunsaturated compounds with inorganic acidifying compounds and either with or without a low molecular weight unsaturated compound, by incorporating in said objects one or more compounds selected from the group consisting of amines and amine salts.

The term "amine," as employed herein, includes the various primary, secondary or tertiary amines of aliphatic, aromatic or alicyclic character wherein but a single amino nitrogen atom is attached to any given carbon atom not forming a part of a ring. Representative compounds falling within this class are saturated, unsubstituted aliphatic monoamines, such as butylamine, isopropylamine, pentylamine, octylamine, decylamine, heptadecylamine, octadecylamine, heptadecenylamine, diisopropylamine, dioctylamine, dioctadecylamine, N-octyl-heptadecylamine, triethylamine, N-propyl-diethylamine, N-alkyl-diethylamine and undecenylamine; aralkyl monoamines, such as benzylamine, N-ethylbenzylamine, phenethylamine; carbocyclic aromatic amines in which the amino nitrogen atom is directly attached to the aryl nucleus, and in which the amino nitrogen atom is unsubstituted with other than such aryl groups, examples of this group being o-toluidine, p-toluidine, cumidine, alpha-naphthylamine, p-phenylenediamine, p-diaminobiphenyl, N-cetylaniline, N-phenyl-beta-naphthylamine, triaminobenzene, diphenylamine, N-methyl-N-isoamyl-aniline, N-ethyl-N-octylaniline, ethyl-N-hexylaniline and triphenylamine, cyclohexylamine, cyclopentylamine, 1,2-propanediamine, 1,4 - naphthalenediamine, 4- methylcyclohexylamine, 4,4 - diaminodiphenylethane, and di - (p - amylphenyl) amine. Also included by the term "amine" are the various polar substituted compounds such as amino alcohols and amino acids as well as the N-haloamines. Representative substituted amino compounds are triethanolamine, dibutylethanolamine, p-aminophenol, N,N'-dichloroquinonediimine, beta-aminopropionic acid, alpha-aminocaprylic acid, allyl beta-aminocapronate, diallyl 4-amino-1,2-benzenedicarboxylate and ethyl p-aminobenzoate. In general, a preferred class of amines is made up of those compounds having at least one primary amine (—NH$_2$) group.

A more preferred class of amines coming within the foregoing class is that comprising heterocyclic compounds having only carbon and nitrogen atoms in the ring, representative compounds of this preferred class being hexamethylene tetramine, melamine, phenyl melamine, 2-(2-methyldodecyl)pyridine, (methyl-2-dodecyl)-2-pyridine, 8-oxy-quinoline and phenylindole. Of these heterocyclic amines, it is most preferred to use at least one compound selected from the group consisting of hexamethylene tetramine and melamine, the same being used alone, in conjunction with one another, or with other amine compounds.

It also forms a feature of the present invention to stabilize the above-described reaction products with both an amine of the type described in the preceding paragraphs together with an amine having the general formula:

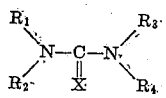

wherein X is oxygen, sulfur or the imine (NH) group and R$_1$, R$_2$, R$_3$ and R$_4$ represent hydrogen atoms, hydrocarbon radicals or polar-substituted hydrocarbon radicals. Compounds of this class, representative members of which are urea, thiourea, guanidine, N,N- and N,N'-diphenyl urea, N,N- and N,N'-diphenyl thiourea and N,N- and N,N'-diphenyl guanidine, are disclosed in our copending application, Serial No. 37,056, filed July 3, 1948, as useful stabilizers for the reaction products discussed above. When amines of the foregoing types are employed in conjunction with one another in sulfur dioxide-rubbery polymer reaction products, there is observed not only an improved stability in the treated reaction products, but also an improvement in the ability of the latter to retain their improved stability even after repeated washings in hot soap solutions. This is particularly the case with combinations of thiourea and/or urea with melamine and/or hexamethylene tetramine.

The term "amine salts" includes compounds of the type formed by reacting an amine of the type containing but a single amino nitrogen atom attached to any given carbon atom not forming a part of a ring with a mineral acid, for example, as well as quarternary ammonium salts of the type formed by reacting a tertiary amine of the foregoing type with an alkyl halide, for example. Representative compounds falling into this class are aniline hydrochloride, dimethyldiethylammonium iodide, tetramethylammonium chloride, trimethylamine hydrochloride, undecylamine hydrochloride, N-cetylaniline hydrochloride, cetylamine hydrochloride, cetylpyridinium bromide, cetyltrimethylammonium bromide, cetylpyridimium chloride and diethyloctadecyloxymethylammonium chloride.

The present invention also contemplates using one or more compounds from the aforedesignated class consisting of amines and amine salts together with one or more amides in order to improve the stability of the above described reaction products. The term "amide," as employed herein, includes such compounds as acetamide, stearic acid amide, benzamide and acetanilide, for example.

The stabilizer chosen, which, as noted above, may be one or a mixture of several compounds, can be introduced into the reaction product in one or more of a number of different ways. Thus, for example, the stabilizer may be added to the solution of rubber or other polyunsaturated high molecular weight reactant before the same is brought into the reactive engagement with sulfur dioxide or other acidifying compound employed; alternatively, it may be added to the medium containing the acidifying compound. The practice of either of the foregoing methods requires that the stabilizer be soluble or at least dispersible in the liquid medium present, and preferably it should in no way interfere with the desired reaction between the respective unsaturated and acidic compounds. Since some such interference may occur, particularly as the concentration of stabilizer is increased or the more alkaline stabilizers are employed, the preferred manner of adding the stabilizer is to bring a solution thereof into contact with the already formed reaction product, preferably when the latter is still in the swollen condition due to its manner of production in the coagulating bath and/or as a result of subsequent washing steps. Thus, filaments produced by spinning a solution of peroxide-activated rubber into an ethanol-water-sulfur dioxide coagulating bath may thereafter be immersed in a solution of a stabilizer, as hexamethylene tetramine, in water or in ethanol, for example, and left therein for any desired period of time. Other appropriate solvents are acetone, propanol, butanol and methyl ethyl ketone. On being withdrawn from the stabilizer solution, the filaments may then be washed in the conventional manner, as with alcohol, water, dilute caustic or other liquid, stretched, dyed, or otherwise treated, following which they may be dried and used. If desired, one or more of such washing, stretching and/or dyeing steps, may intervene between the actual precipitation of the filaments in the coagulating bath and their immersion in the stabilizer solution, the filaments preferably remaining in the swollen conditions during all said processing steps. Alternatively, the filaments may be treated in the dried (unswollen) condition with a solution of the desired stabilizing compound, preferably in a solvent such as benzene, ethyl alcohol, acetone or ethyl acetate which acts to swell the filament, though non-filament swelling solvents such as water may be employed in many cases. The stabilizers may also be applied on or in the material to be stabilized otherwise than by impregnation. Thus, the material may be contacted with dispersions of stabilizers or with an atmosphere which contains the stabilizers in the vaporous or atomized state. In the latter case a solution of the stabilizer may be atomized, if desired.

The concentration of stabilizer to employ, whether the same be added to the unreacted materials, or is applied as a solution to the already formed reaction product, is not critical. Thus, good results are obtained with solutions containing from about 0.1 to 20% by weight of a stabilizer, and some improvement can be effected even when using smaller quantities than 0.1%, particularly when more than one stabilizer be employed. Preferably, however, the concentration of stabilizer should be at least 0.5%, based on the entire weight of the solution, with concentrations of more than 10% seldom being justified in terms of improved results.

The period during which any given reaction product should be left in a stabilizer solution will vary depending on a number of circumstances. Thus, in the case of filaments and other small shapes the soaking period may be somewhat shorter than with articles of greater cross section. Again, with more concentrated stabilizer solutions the soaking period may be somewhat shortened. Another factor is the ease with which the reaction product is able to take up the stabilizer solution; thus, freshly formed, undried products (e. g., swollen filaments) are considerably more receptive to the stabilizer solution than are objects which have already been dried and now must take up fresh quantities of solvent along with the dissolved stabilizer. In general, immersion periods of from 1 to 30 minutes are satisfactory with swollen filaments, though soaking periods of one or more hours are desirable when treating dried filaments. In all cases, extension of the soaking time is in no way harmful and in many cases proves of considerable benefit. Where the stabilizer is added to the unreacted solution of rubber or sulfur dioxide, for example, no modification need be made in the normal process by which said compounds are reacted.

Of more importance than the duration of the treatment with stabilizer solution is the temperature thereof. It forms a feature of the present invention that improved results are obtained by employing a heated stabilizer solution, by which term is meant a solution having a temperature of 50° C. or above, and preferably between 50 and 150° C. The use of such heated solutions serves in a measure to fix the stabilizer in the reaction product, thereby increasing its resistance to removal during ageing, or as a result of subsequent washing or other treating steps.

Still further improved results, notably as regards increased stability and resistance against age - deterioration following soap - washing and/or alkali-treating steps, are achieved by subjecting reaction products already impregnated with stabilizer compound to a treatment involving heating in a gaseous environment such as air or nitrogen. The temperatures employed in this heating step may range from about 50 to 250° C., though temperatures of from about 80 to 150° C. are preferred. Effective treatments carried out in the latter temperature range normally take from ½ to 4 or more hours, the relatively higher temperature permitting effective use of the shorter treating intervals. This dry heating step may be practiced with beneficial results no matter whether the impregnation treatment referred to in the preceding paragraph be conducted at elevated temperatures or not, though as a general rule the one heating treatment re-enforces the other.

It has also been found that improved results as regards fixation of stabilizer may be obtained by utilizing stabilizer compounds such as heptadecenylamine or diallyl 4-amino-1,2-benzenedicarboxylate, which contain one or more alkenyl or other unsaturated, aliphatic groups. Such unsaturated stabilizing compounds are preferably introduced into a solution of rubber or other high molecular weight reactant prior to its reaction with the acidic compound if the full effect of the stabilization treatment is to be obtained, for it seems quite probable that under these circumstances the stabilizer enters into, and chemically forms a part of, the final reaction product.

Still a third way of improving the bond between the reaction product and the stabilizer is to treat the already stabilized product with an aldehyde or isocyanate, the stabilizer present in the product reacting with the aldehyde or isocyanate under these circumstances to form condensation or poly-addition compounds, either of which are of such a character as to be washed out of the product only with the greatest difficulty.

The following examples illustrate the present invention in various of its embodiments:

*Example I*

The material to be stabilized was a reaction product of natural rubber with sulfur dioxide in the form of dried filaments with a sulfur content of 22%, which material was produced by spinning a solution of natural rubber and tetralin hydroperoxide into a sulfur dioxide-containing coagulating bath and thereafter stretching, soaking and drying the filaments. Samples of these dried filaments were soaked in solutions of various stabilizers or combinations of stabilizers for 4 hours, after which they were cursorily rinsed with ethanol and dried in the open air, the concentration and temperature of the various stabilizer solutions, as well as their identity, being indicated in Table I below. Some of the samples were then washed for 4 hours at 60° C. with a 0.4% solution of Marseilles soap, and in a few cases the soap treatment was repeated. The stability of the samples was determined both before and after washing, the stability in each test being determined by measuring the quantity of $SO_2$ liberated per unit of weight of the material upon heating the same for 2 hours at 125° C. in an air current. In the case of the tests reported in Table I below, this $SO_2$ loss is expressed as the percentage of the quantity of $SO_2$ liberated per unit of weight in a blank test, i. e., with like filaments unstabilized but otherwise subjected to the same physical treatment as the stabilized products. The actual quantity of $SO_2$ split off from the various blank samples during each 2 hour heating test period varied from about 1.5 to 3% by weight of the entire sample, this corresponding to a loss in tensile strength of from about 9 to 18%.

Moreover, comparative tests were carried out on the sample stabilized with the 1% aqueous melamine solution at 55° C. and marked with $(x)$ in the table below, and an untreated (blank) sample in order to determine their tensile strength. When heating the nonstabilized product for 7½ hours at 125° C., the tensile strength was reduced to 44% of its original value, whereas with the stabilized product the tensile strength was still 90% of its original value at the end of this extended heating period.

TABLE I

| Stabilizer | Impregnation bath | | | SO$_2$ liberated on heating | | |
|---|---|---|---|---|---|---|
| | Solvent | concentration stabilizer in percent | Temp., °C. | without washing | after washing | |
| | | | | | 1X | 2X |
| None | | | | 100 | 100 | 100 |
| Heptadecyl amine | ethanol | 2 | 20 | 40 | | |
| α-naphthyl amine | do | 2 | 20 | 22 | | |
| p-phenylene diamine | do | 2 | 20 | 10 | | |
| benzidine | do | 2 | 20 | 17 | | |
| Do | do | 2 | 78 | 7 | | |
| cetyl aniline | do | 2 | 20 | 29 | | |
| N-phenyl-β-naphthyl amine | do | 2 | 78 | 10 | | |
| thiourea | do | 2 | 20 | 6 | 16 | 57 |
| hexamethylene tetramine | do | 2 | 20 | 10 | 18 | 18 |
| Do | do | 2 | 78 | 10 | 9 | |
| Do | water | 2 | 78 | 10 | 75 | |
| melamine | do | 2 | 78 | 10 | 15 | |
| melamine (x) | do | 1 | 55 | 15 | 27 | |
| phenyl melamine | benzene | 2 | 70 | 8 | | |
| oxy-8-quinoline | ethanol | 2 | 78 | 10 | 10 | |
| phenylindol | do | 2 | 78 | 30 | 25 | |
| methyl-2-dodecyl-2-pyridine | do | 2 | 78 | 15 | 30 | |
| cetyl pyridinium chloride | do | 2 | 78 | 30 | | |
| hexamethylene tetramine and melamine | water | { 0.75 / 0.75 } | 78 | 6 | 20 | |
| hexamethylene tetramine and melamine | { water / do } | { 2 / 2 } | 78 | 10 | { 75 / 15 } | |
| hexamethylene tetramine and thiourea | { ethanol / do } | { 0.75 / 0.75 } | 20 | 1 | 10 | 8 |
| hexamethylene tetramine and thiourea | { do / do } | { 2 / 0.1 } | 20 | 7 | 15 | |
| hexamethylene tetramine and thiourea | { do / do } | { 2 / 2 } | 20 | 10 | 18 | 18 |
| hexamethylene tetramine and urea | { do / do } | { 0.75 / 0.75 } | 20 | 6 | 16 | 57 |
| hexamethylene tetramine and urea | { do / do } | 2 | 78 | 2 | 8 | |
| melamine and thiourea | { water / do } | { 0.5 / 0.5 } | 55 | 10 | { 9 / 100 } | |
| | | | | 7 | 37 | |

Example II

The stabilization operations summarized in Example I above involved soaking the dried filaments for 4 hours in the desired stabilizer solution. On repeating the soaking experiments with freshly prepared, swollen filaments it is found that equivalent results as regards freedom from loss of sulfur dioxide and general stability in the finally dried filaments are obtained by soaking the filaments in stabilizer solutions for periods of from 1 to 15 minutes.

Example III

This example illustrates the advantages achieved by soaking the unstabilized filaments in hot solutions of the desired stabilizing compounds. In this case one lot of filaments of the kind described in Example I above was immersed for a period of 4 hours in a 1% aqueous solution of melamine maintained at 20° C.; another lot of the same filaments was soaked in a similar manner, but with the melamine solution maintained at 55° C. Both lots of filaments were then dried and given an accelerated ageing test wherein the filaments were heated in air at 125° C. for 2 hours. The filaments soaked at 20° lost 0.74% by weight sulfur dioxide during this test whereas those soaked at 55° lost only 0.28% by weight thereof.

In another operation, filaments of the same variety were stabilized by immersion for 4 hours in a 2% solution of hexamethylenetetramine in ethanol, the bath in the one case being maintained at 20° C. and in the other at 78° C. On being dried and heated in air for 2 hours at 125° C., those filaments soaked at 20° lost 0.26% by weight sulfur dioxide whereas those soaked at 78° lost only 0.21% by weight of this compound.

Example IV

This example illustrates the benefits achieved by heating the stabilized filaments in a gaseous environment, both with and without a previous heating via the solution of stabilizing compound.

The results given in Table II below show that filaments subjected to such heat treatment(s) exhibit a greatly improved stability (as measured in terms of sulfur dioxide loss) even after severe washing in soap solutions. In making these tests all samples excepting the blank were first impregnated by soaking dried filaments of the type described in Example I with a 2% solution of hexamethylenetetramine in ethanol for 4 hours, in the one case at 20° C. and in the other at 78° C. The washing treatment referred to in the table is one whereby dried, stabilized-impregnated filaments were washed for 4 hours at 60° C. with a 0.4% soap solution, followed by rinsing for 17 hours in water at 20° C. The air heating step referred to in the table is one whereby the stabilized filaments were heated in air at 125° C. for 2 hours either before or after the soap washing treatment, as indicated.

TABLE II

| Test No. | Treatment Sequence | Impregnation Temp., °C. | Percent By weight of sulfur dioxide lost on heating the fully treated sample in air for 2 hours at 125° C. |
|---|---|---|---|
| 1 | Blank (ethanol only) | 20–78 | 2.5 |
| 2 | Impregnation only | { 20 / 78 } | { 0.26 / 0.21 } |
| 3 | Impregnation+Washing | { 20 / 78 } | { 0.36 / 0.37 } |
| 4 | Impregnation+Air heating | { 20 / 78 } | { 0.36 / 0.24 } |
| 5 | Impregnation+Washing+Air heating+Washing | { 20 / 78 } | { 0.32 / 0.18 } |

From the above data it will be seen that even though the washing treatment be so severe as to nullify the benefits normally obtained through use of the hot solution of stabilizers (Test No. 3), nevertheless the hot air treatment is always effective to reduce SO₂ loss.

*Example V*

The present example again illustrates the benefits achieved by air-heating the stabilized fibers, the washing in this case being in a 0.1 N solution of sodium hydroxide. Dried filaments similar in kind to those described in Example I above were stabilized by impregnation for 4 hours in a 2% aqueous solution of melamine at 80° C., the "blank" excepted. One portion of the so-stabilized filaments were then heated in air at 125° C. for 2 hours whereas the others were not. All filaments, including the blank, were then immersed in a 0.1 N aqueous solution of NaOH at 20° C. for 4 hours, following which the filaments were washed in water for 48 hours and in ethanol for 24 hours. The filaments were then dried and tested for sulfur dioxide loss occurring during heating at 125° C. for 2 hours. In the case of the blank the sulfur dioxide loss was 14.5%. Those filaments stabilized with melamine, but not heated in air prefatory to caustic washing lost 3.42% by weight sulfur dioxide. However, the loss was reduced to only 0.3% in the case of the air-heated fibers.

*Example VI*

Synthetic rubber filaments containing approximately 20% sulfur dioxide were produced by spinning a solution of butadiene polymer (molecular weight approximately 50,000) activated with tetralin hydroperoxide into an ethanol-water coagulating bath containing dissolved sulfur dioxide. One lot of these filaments was stabilized by soaking in an ethanol solution containing 0.75% by weight thiourea and 0.75% by weight hexamethylenetetramine at 20° C. for a period of 4 hours whereas the other group was soaked in ethanol only. On drying both sets of filaments it was found that those impregnated with thiourea-hexamethylene dicyandiamide had a resistance against thermal deterioration which was approximately 5 times as great as that of the unstabilized filaments.

The invention claimed is:

1. The method of increasing the resistance to deterioration of a product formed on the reaction of natural rubber with sulfur dioxide, these being the only reactants, said method comprising impregnating said product, while it is in a swollen, coagulated state, with a solution containing hexamethylenetetramine.

2. The method of increasing the resistance to deterioration of a product formed on the reaction of natural rubber with sulfur dioxide, these being the only reactants, said method comprising immersing said product, while it is in a swollen, coagulated state, in a heated solution containing hexamethylenetetramine.

3. The method of increasing the resistance to deterioration of a product formed on the reaction of natural rubber with sulfur dioxide, these being the only reactants, said method comprising impregnating said product, while it is in a swollen, coagulated state, with a solution containing hexamethylenetetramine, and thereafter heating the product in a gaseous environment.

4. The method of increasing the resistance to deterioration of a product formed on the reaction of natural rubber with sulfur dioxide, these being the only reactants, said method comprising impregnating said product, while it is in a swollen, coagulated state, with a heated solution containing hexamethylenetetramine, and thereafter heating the impregnated product in a gaseous environment.

5. The method of increasing the resistance to deterioration of a product formed on the reaction of natural rubber with sulfur dioxide, these being the only reactants, said method comprising impregnating said product, while it is in a swollen, coagulated state, with a solution containing a mixture made up of hexamethylenetetramine and dicyandiamide.

6. The method of increasing the resistance to deterioration of a product formed on the reaction of a high molecular weight, synthetic, rubbery butadiene polymer with sulfur dioxide, these being the only reactants, said method comprising impregnating said product, while it is in a swollen, coagulated state, with a solution containing hexamethylenetetramine as stabilizer.

7. The method of increasing the resistance to deterioration of a product formed on the reaction of a high molecular weight, synthetic, rubbery butadiene polymer with sulfur dioxide, these being the only reactants, said method comprising impregnating said product, while it is in a swollen, coagulated state, with a solution containing a mixture of stabilizers containing hexamethylenetetramine, and dicyandiamide.

8. The method of claim 6 wherein the stabilizer-containing reaction product is impregnated with an aldehyde to fix the stabilizer compound in the reaction product.

9. The method of claim 6 wherein the stabilizer-containing reaction product is impregnated with an isocyanate to fix the stabilizer compound in the reaction product.

10. In a method wherein a solution of natural rubber and tetralin hydroperoxide is injected into a coagulating bath containing available sulfur dioxide, these being the only reactants, whereby there is precipitated in the bath a reaction product of the rubber and sulfur dioxide in the form of a continuous, swollen filament which is then withdrawn from the coagulating bath, the step comprising impregnating the still swollen filament with a solution containing hexamethylenetetramine as stabilizer.

11. In a method wherein a solution of a rubbery polymer of at least one compound selected from the group consisting of the conjugated diolefins and chloroprene in the presence of a peroxide activating agent is injected into a coagulating bath containing available sulfur dioxide, these being the only reactants, whereby there is precipitated in the bath a reaction product of the rubbery polymer and sulfur dioxide which is then withdrawn from the coagulating bath, the step comprising impregnating without dissolving the still-swollen reaction product with a solution containing at least one stabilizer compound selected from the group consisting of (1) saturated, unsubstituted aliphatic monoamines; (2) carbocyclic aromatic amines in which the amino nitrogen atom is directly attached to the aryl nucleus and in which the amino nitrogen atom is unsubstituted with other than such aryl groups; (3) heterocyclic amines having only carbon and nitrogen atoms in the ring; and (4) salts of said amines, in all cases the amines containing but a single nitrogen atom attached to any given carbon atom not forming a part of a ring.

12. A novel stabilized composition of matter comprising a reaction product of a rubbery polymer of at least one compound selected from the group consisting of the conjugated diolefins and chloroprene in the presence of a peroxide activating agent and sulfur dioxide, these being the only reactants, which composition of matter is prepared by impregnating said reaction product, while it is in coagulated state, having a definite form and swollen with solvent, with a solution of at least one stabilizer compound selected from the group consisting of (1) saturated, unsubstituted aliphatic monoamines; (2) carbocyclic aromatic amines in which the amino nitrogen atom is directly attached to the aryl nucleus and in which the amino nitrogen atom is unsubstituted with other than such aryl groups; (3) heterocyclic amines having only carbon and nitrogen atoms in the ring; and (4) salts of said amines, in all cases the amines containing but a single nitrogen atom attached to any given carbon atom not forming a part of a ring, and removing said solvent, said stabilized composition of matter being characterized by a high resistance to deterioration.

13. The method of increasing the resistance to deterioration of a product formed on the reaction of natural rubber with sulfur dioxide, these being the only reactants, said method comprising impregnating said product, while it is in a swollen, coagulated state, with a solution containing melamine.

14. The method of increasing the resistance to deterioration of a product formed on the reaction of natural rubber with sulfur dioxide, these being the only reactants, said method comprising impregnating said product, while it is in a swollen, coagulated state, with a heated solution containing melamine, and thereafter heating the impregnated product in a gaseous environment.

15. The method of increasing the resistance to deterioration of the product formed on the reaction of a high molecular weight, synthetic, rubbery butadiene polymer with sulfur dioxide, these being the only reactants, said method comprising impregnating said product, while it is in a swollen, coagulated state, with a solution containing melamine as stabilizer.

16. The method of increasing the resistance to deterioration of the product formed on the reaction of a high molecular weight, synthetic, rubbery butadiene polymer with sulfur dioxide, these being the only reactants, said method comprising impregnating said product, while it is in a swollen, coagulated state, with a solution containing a mixture of melamine and dicyandiamide as stabilizers.

17. In a method wherein a solution of natural rubber and tetralin hydroperoxide is injected into a coagulating bath containing available sulfur dioxide, these being the only reactants, whereby there is precipitated in the bath a reaction product of the rubber and sulfur dioxide in the form of a continuous, swollen filament which is then withdrawn from the coagulating bath, the step comprising impregnating the still-swollen filament with a solution containing melamine as stabilizer.

18. In a method wherein a solution of natural rubber in the presence of a peroxide activating agent is injected into a coagulating bath containing available sulfur dioxide, these being the only reactants, whereby there is precipitated in the bath a reaction product of the rubbery polymer and sulfur dioxide in the form of a continuous swollen filament which is then withdrawn from the coagulating bath, the step comprising impregnating without dissolving the still-swollen filament with a solution containing at least one stabilizer compound selected from the group consisting of (1) saturated, unsubstituted aliphatic monoamines; (2) carbocyclic aromatic amines in which the amino nitrogen atom is directly attached to the aryl nucleus and in which the amino nitrogen atom is unsubstituted with other than such aryl groups; (3) heterocyclic amines having only carbon and nitrogen atoms in the ring; and (4) salts of said amines, in all cases the amines containing but a single nitrogen atom attached to any given carbon atom not forming a part of a ring.

19. A novel stabilized composition of matter comprising a reaction product of natural rubber and sulfur dioxide in the presence of a peroxide activating agent, these being the only reactants, which composition of matter is prepared by impregnating said reaction product, while it is in coagulated state, having a definite form and swollen with solvent, with a solution containing at least one stabilizer compound selected from the group consisting of (1) saturated, unsubstituted aliphatic monoamines; (2) carbocyclic aromatic amines in which the amino nitrogen atom is directly attached to the aryl nucleus and in which the amino nitrogen atom is unsubstituted with other than such aryl groups; (3) heterocyclic amines having only carbon and nitrogen atoms in the ring; and (4) salts of said amines, in all cases the amines containing but a single nitrogen atom attached to any given carbon atom not forming a part of a ring, said impregnated reaction product being characterized by a high resistance to deterioration.

JOHAN MICHAEL GOPPEL.
GOTTFRIED ERNST RUMSCHEIDT.
JOHANNES THOMAS HACKMANN.

References Cited in the file of this patent

UNITED STATES PATENTS

| Number | Name | Date |
|---|---|---|
| 2,302,362 | Nelles | Nov. 17, 1942 |
| 2,379,354 | Hilton | June 26, 1945 |
| 2,396,556 | Cox | Mar. 12, 1946 |
| 2,403,960 | Stoops | July 16, 1946 |
| 2,439,610 | Morris | Apr. 12, 1948 |
| 2,469,847 | Rumscheidt | May 10, 1949 |
| 2,511,498 | Die Nie | June 13, 1950 |

FOREIGN PATENTS

| Number | Country | Date |
|---|---|---|
| 575,736 | Great Britain | Mar. 4, 1946 |
| 593,036 | Great Britain | Oct. 7, 1947 |